Nov. 24, 1931. C. S. JENNINGS 1,833,873
PNEUMATIC DISPATCH SYSTEM
Filed Oct. 31, 1930 5 Sheets-Sheet 2
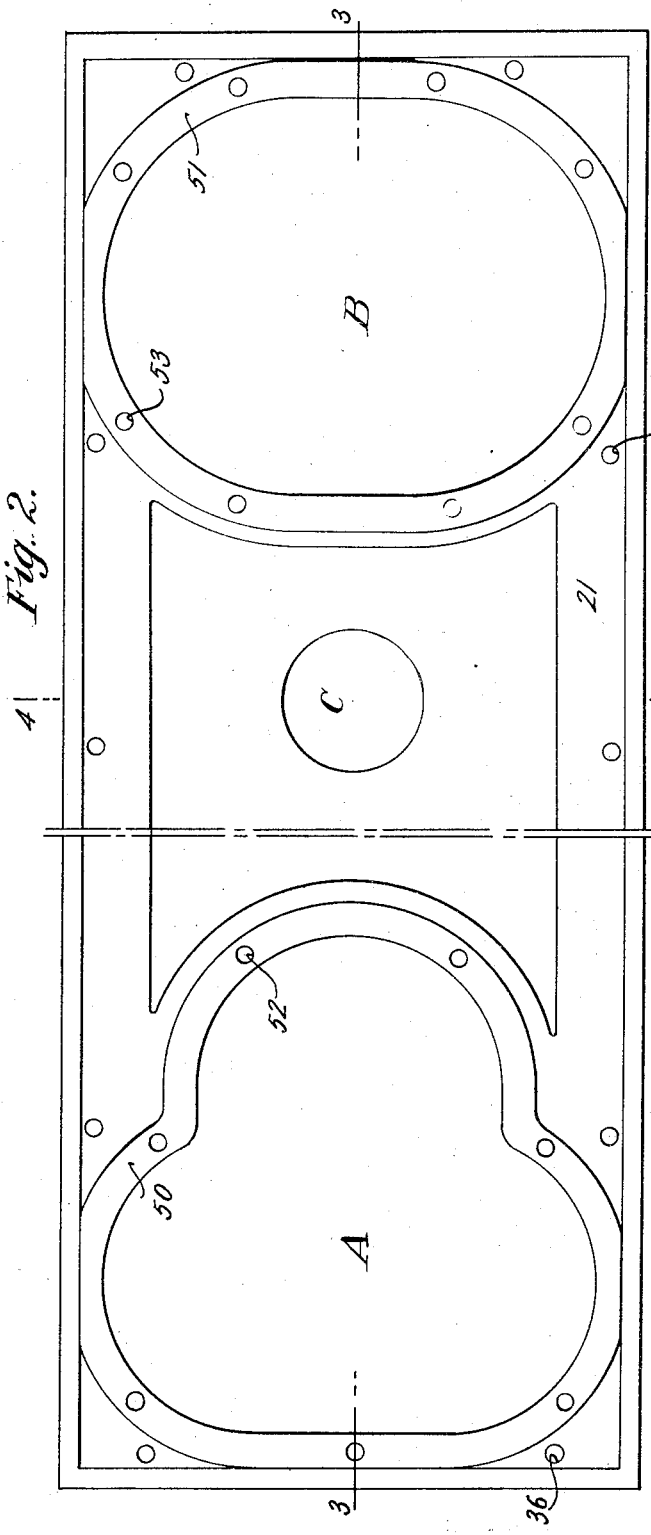
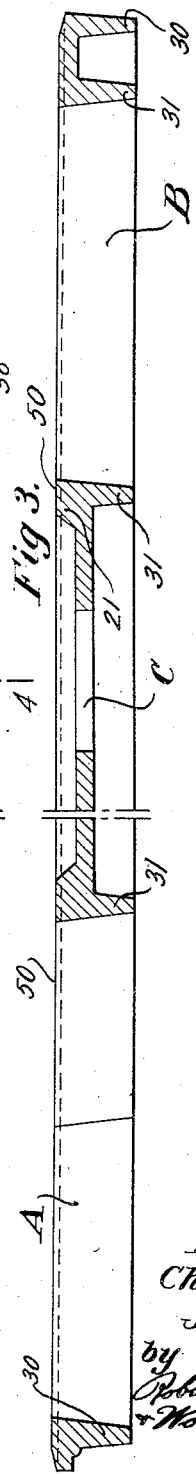
Inventor,
Chester S. Jennings.
by Roberts, Cushman & Woodbury.
Attys.

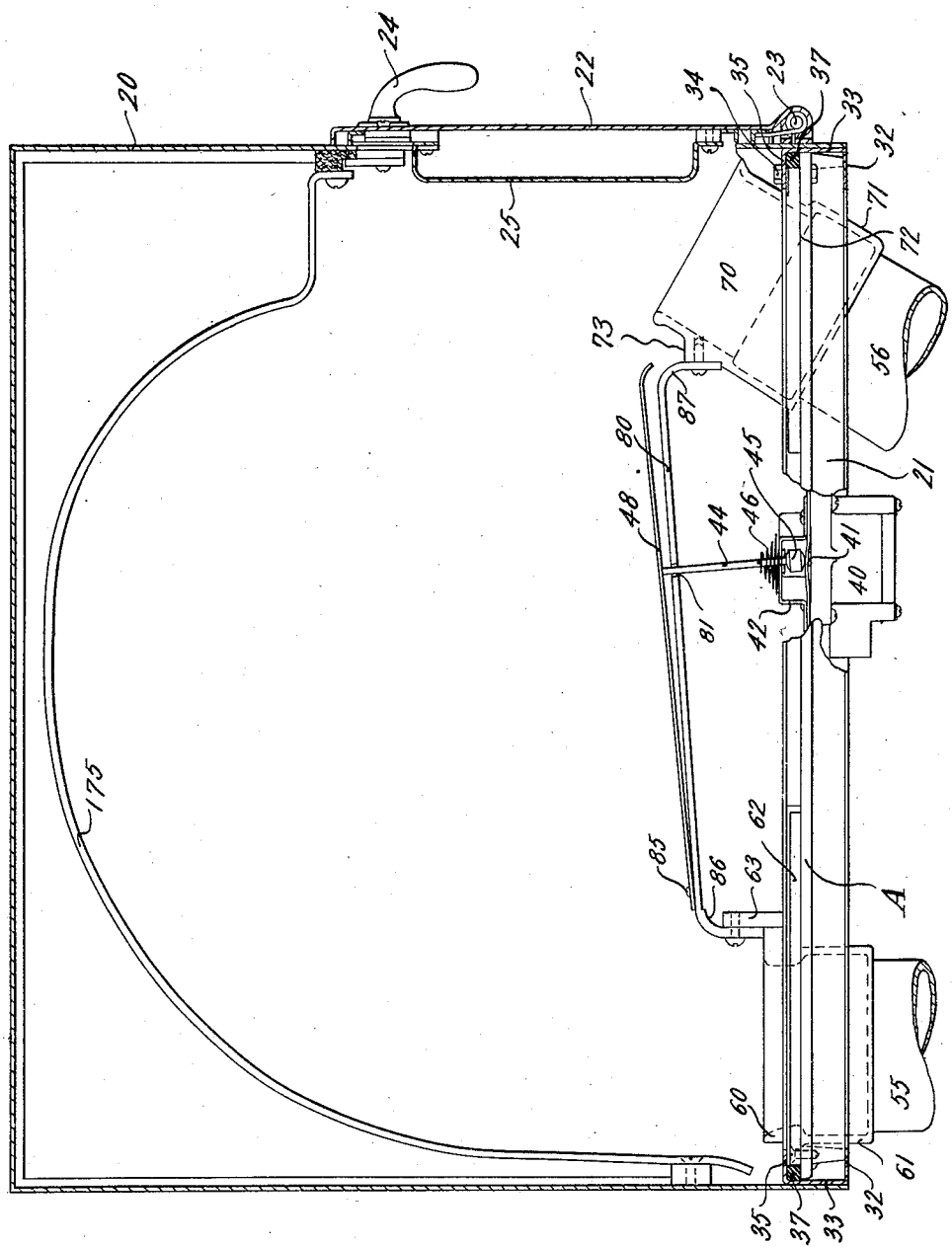

Nov. 24, 1931.  C. S. JENNINGS  1,833,873
PNEUMATIC DISPATCH SYSTEM
Filed Oct. 31, 1930   5 Sheets-Sheet 3
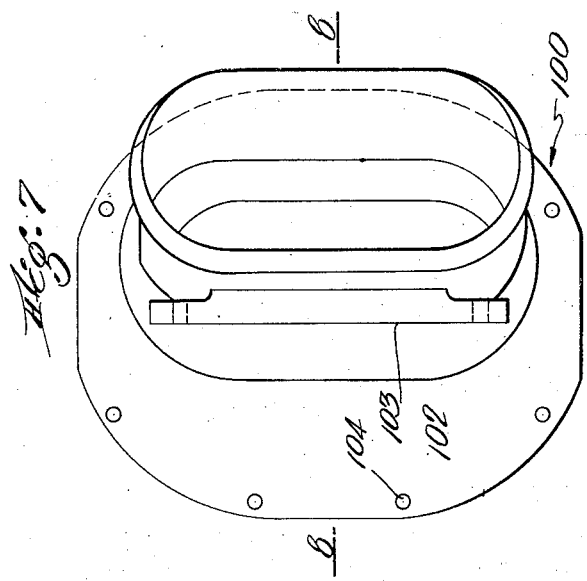
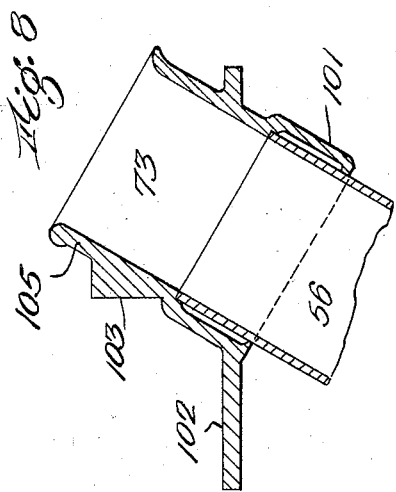
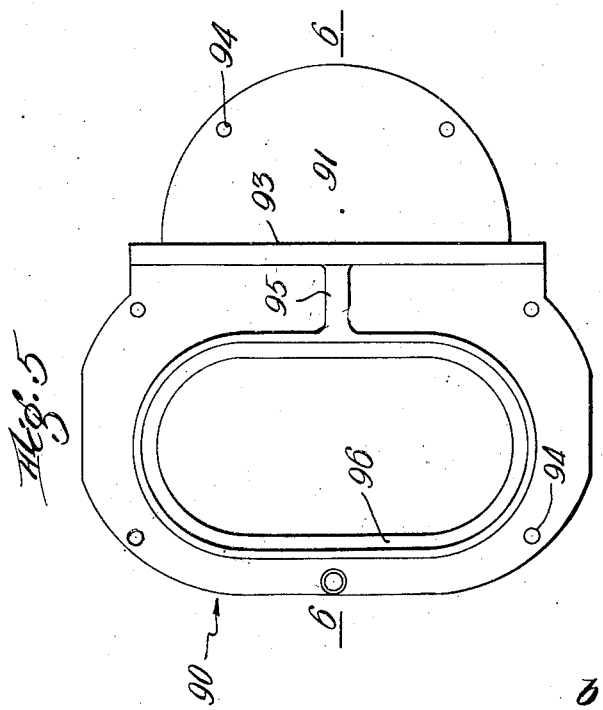
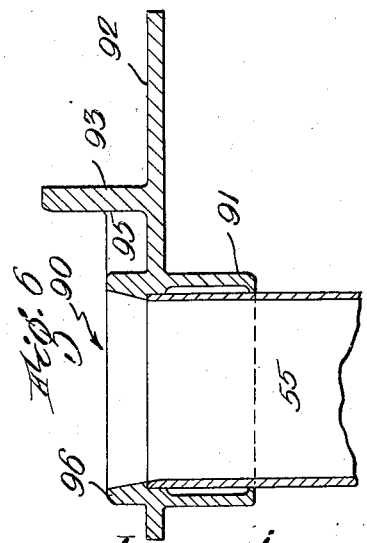
Inventor,
Chester S. Jennings.
by Roberts, Cushman & Woodbury
Attys.

Nov. 24, 1931.  C. S. JENNINGS  1,833,873
PNEUMATIC DISPATCH SYSTEM
Filed Oct. 31, 1930   5 Sheets-Sheet 4
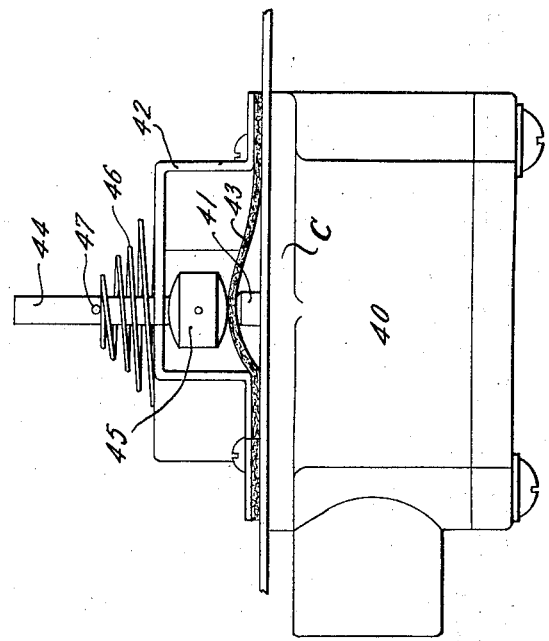
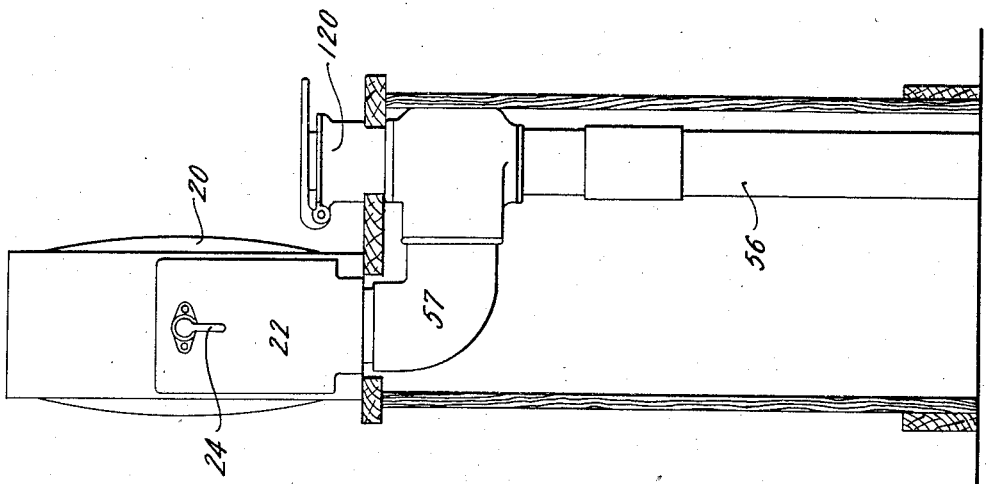
Inventor
Chester S. Jennings.
by Roberts Cushman Woodbury
Attys.

Inventor
Chester S. Jennings.
by Roberts, Cushman & Woodbury
Attys.

Patented Nov. 24, 1931

1,833,873

UNITED STATES PATENT OFFICE

CHESTER S. JENNINGS, OF SYRACUSE, NEW YORK, ASSIGNOR TO THE LAMSON COMPANY, OF SYRACUSE, NEW YORK, A CORPORATION OF NEW YORK

PNEUMATIC DISPATCH SYSTEM

Application filed October 31, 1930. Serial No. 492,484.

This invention relates to an improvement in a pneumatic dispatch system and more particularly to a station unit therefor by which carriers are dispatched into and/or received from transit tubes. The dimensions of the carrier dispatching and receiving elements of the section are, of course, fixed by the tubes through which the carriers travel and it has heretofore been the general practice to construct each station unit with reference to the particular size of the carriers and tubes employed in the system. The walls of the station units through which access to the tubes are provided are generally castings and hence it has heretofore been necessary to provide a separate set of castings for each type of pneumatic tube system.

The primary object of this invention is to provide a station unit wherein the walls through which the unit is connected to the carrier transport tubes are so constructed that the unit can be employed with any of the well known and commonly used systems and to which walls are secured the various tube rings which will be employed with the particular type of system, the walls being so built that these rings can be installed without difficulty thus obviating the necessity of providing different station units for each type of system and permitting the formation of a standardized unit having a pleasing form and appearance which can be equipped with receiving and dispatch rings of the proper conformation and thereby employed in whatever system is desired.

Other objects of this invention include the provision of means which will receive the impact of the arriving carriers and which will signal the arrival of the carriers to the operator, and means by which inadvertent redispatch of a carrier is prevented.

The transit tubes of pneumatic carrier systems most commonly used at the present time are either round or oval, the first type being either three or four inches in diameter and the second type being either three inches by six inches or four inches by seven inches. In the second type the carriers are transported either flat or on edge depending upon the conditions under which the system is installed. The station units may be for dispatching alone, for receiving alone or for both dispatching and receiving and may be installed either at a central station or an out station.

For the purpose of illustrating this invention I have elected to show a station unit by which carriers may be both dispatched and received, which unit may be used as an element of a pneumatic tube system of any of the well-known types.

In the drawings:

Fig. 1 is an elevation, partly in section, of a station unit embodying this invention whereby carriers may be received and dispatched and adapted for use with one type of system;

Fig. 2 is a plan view of the base member of the station;

Figure 10:
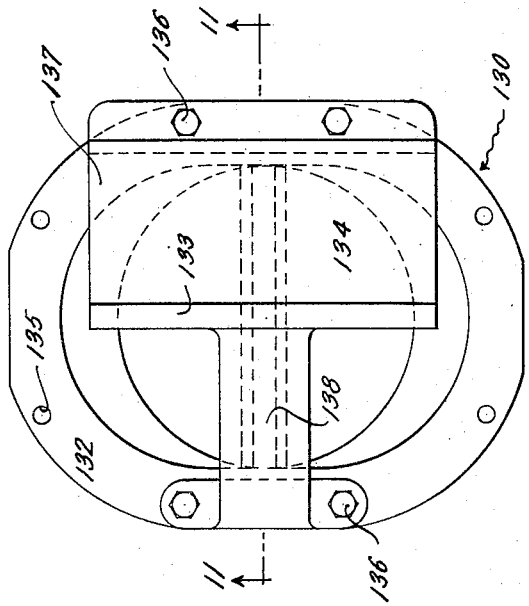
Figure 11:
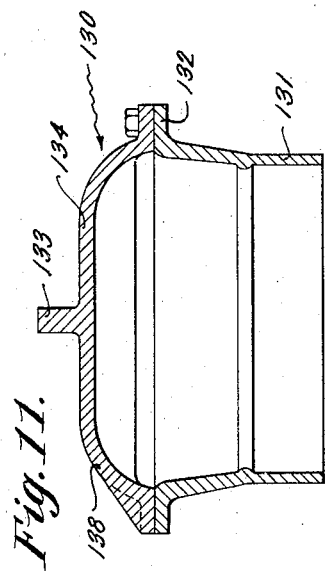
Figure 12:
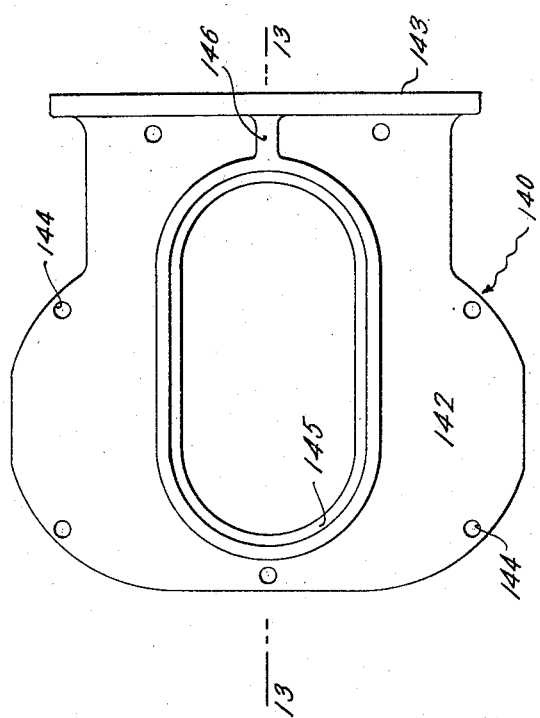
Figure 13:
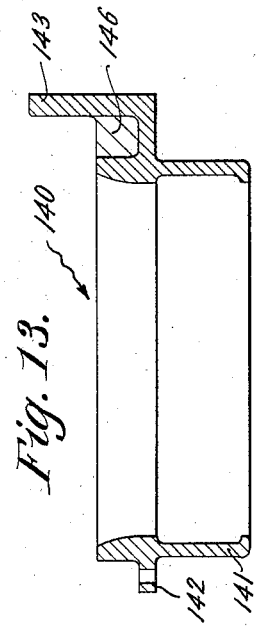

Figs. 3 and 4 are sectional views taken along the lines 3—3 and 4—4 of Fig. 2;

Fig. 5 is a plan view and Fig. 6 a sectional view taken along the lines 6—6 of Fig. 5, of the fitting employed with the station unit shown in Fig. 1 as the delivery element of a system of another type;

Figs. 7 and 8 are similarly related views of the fitting employed as the dispatch element of such a system;

Fig. 9 is a side elevation of a station unit in which the carriers are dispatched from without the housing as for example in systems of four by seven inch edge type;

Fig. 10 is a side elevation of the fitting installed at the dispatch opening of the station unit when the carriers are dispatched from without the housing;

Fig. 11 is a sectional view taken along the line 11—11 of Fig. 10;

Fig. 12 is a plan view of a delivery fitting for a three by six inch edge type system;

Fig. 13 is a sectional view taken along the line 13—13 of Fig. 12; and

Fig. 14 is an enlarged side elevation of a signal device by which the operator is advised of the arrival of the station unit of a carrier.

The station unit illustrated in Fig. 1 as embodying this invention comprises an air tight housing 20, including a base 21. In one wall of the housing 20 is mounted a door 22, preferably secured by a hinge 23 and held in the closed position by a latch 24, which may be of any desired type. Upon the inner face of the door is mounted a bumper or buffer member 25, the purpose of which will be set forth hereinbelow. In the base 21, as shown in detail in Figs. 2, 3 and 4 are formed an opening A through which carriers enter the terminal and an opening B adjacent the door 22. The opening A will hereinafter be referred to as the delivery or receiving opening and the opening B as the dispatch opening. Intermediate the openings A and B is formed in the base a third opening C which, for reasons of convenience, is located adjacent the dispatch opening.

The base 21 is provided with a continuous downwardly projecting flange 30 by which the openings A, B and C are surrounded, and a plurality of cross flanges 31 which join portions of the flange 30 and stiffen and support the surface of the base intermediate its ends. The base rests upon, and is supported by the lower flange 32 of a channeled bar 33 carried by the wall of the housing at its lower edge and is secured in place by bolts 34 which pass through holes in the upper flange 35 of the bar 33 and holes 36 in the base. A gasket 37 of felt or other resilient material is inserted between the edge of the base, and the flange 35, as shown, in Fig. 1, to prevent the entry or escape of air around the base.

Mounted on the base adjacent the opening C is a switch device comprising a box 40 which may be of any desired type, and from which projects a button 41. Supported on the box 40 is a frame 42, a strip 43, and a post 44 which terminates in a button 45. The strip 43 which is of felt or other material is interposed between the base and the frame 42 and extends over and closes the opening C thus preventing the entry or escape of air therethrough. The button 41 is normally urged by mechanism (not shown) within the switch 40, against the under face of the strip 43 while the rounded button 45 on the post 44 normally rests upon the upper face of the strip 43 above the push button 41, as shown in Fig. 1. A spring 46, surrounding the pin 44 and resting upon the frame 42, acts upon a pin 47 carried by the pin 44, and thus holds the parts yieldingly in the position illustrated in the drawings. A lever 48, mounted in a manner to be described later, normally rests upon the upper end of the pin 44. The carrier delivered into the terminal falls upon the lever 48, depressing the pin 44 and button 45 so that the push button 41 is depressed. The depression of the button 41 causes the switch to operate and give a signal, audible or otherwise, advising the operator of the delivery of the carrier.

The delivery opening A is irregular in formation and is here shown as of such dimensions that through it can pass freely carriers, the longest capacity of which is seven inches, whether the carriers be delivered flat, that is to say, parallel to the end of the base, or on edge, that is to say, at right angles to the end of the base. The dispatch opening B is here shown as oval in conformation, and through it can pass freely carriers having a large dimension of seven inches or less, and a shorter dimension of under six inches. Each of these openings A and B are surrounded by a flange designated as 50 and 51 respectively. In the flange 50 are provided a plurality of spaced openings 52, while a similar series of spaced openings 53 are provided in the flange 51.

The housing, base and signal device are the same for all the various types of systems above described and in order to adapt a station unit for use with a system which transports carriers of certain specified dimensions, receiving and dispatch elements are mounted upon the base at the openings A and B, and a false bottom to be described later which extends above the base 20 over the opening C and is carried by the elements. The elements will hereinafter be designated as fittings, and are usually, though not necessarily, castings and to them are secured the ends of the transit tubes 55 and 56.

Fig. 1 illustrates the fittings and false bottom with which the station unit is provided for handling carriers four by seven inches flat. At the delivery opening A is mounted a flanged ring 60 which comprises an annular portion 61, a flange 62 and a shoulder 63. The corresponding flanged ring at the opening B is designated by the numeral 70 and comprises an annular portion 71, a flange 72 and a shoulder 73. Projecting into the annular portions 61 and 71 and suitably secured thereto are the ends of the transit tubes 55 and 56 respectively.

Extending above the base 20 over the opening C is a false bottom 80 connected as its ends to the shoulders 63 and 73. The false bottom 80 is of heavy canvas or similar material and has a hole 81 therein through which the upper end of the post 44 projects. The lever 48 is fixed to the false bottom 80 by a rivet 85 passed through one end of the lever preferably that adjacent the receiving opening A and normally rests lightly upon the end of the post 44. Metal plates 86 and 87 reinforce the ends of the false bottom 80 at their attachment to the shoulders 63 and 70 respectively.

When the station unit is to be employed in a system of another type the flanged rings 60 and 70 and the false bottom 80 are replaced by other members of the proper dimensions. Thus for example the station unit may be adapted for use in a system of the three by six inch flat type by substituting for the rings 60 and 70 rings 90 and 100. The ring 90 is shown in detail in Figs. 5 and 6 and the ring 100 is shown in detail in Figs. 7 and 8. Referring to Figs. 5 and 6 it will be noted that the flanged ring 90 which acts as a delivery fitting comprises an annular portion 91, which receives the end of the transit tube 55 a flange 92 and a shoulder 93. The flange 92 has a plurality of openings 94 in the periphery thereof, which openings coincide with the openings 52 formed in the flange 50. The shoulder 93 is reinforced by a strip 95 which connects it to an annular boss 96 at the upper end of the portion 91 having the outline of the carrier to be received at the station unit. The flanged ring or dispatch fitting 100, illustrated in Figs. 7 and 8, comprises an annular portion 101, which receives the end of the transit tube 56 a flange 102 and a shoulder 103. The flange 102 is adapted to rest upon the flange 51 of the base 21, and has apertures 104 therein so located that they coincide with the openings 53 in the flange. The annular portion 101 projects upwardly and downwardly from the flange 102 forming at the upper end an annular boss 105, the walls of which are so spaced as to permit the insertion of a carrier of the three by six inch type and on which the shoulder 103 is carried.

The false bottom (not shown) connecting the elements 90 and 100 is attached to the shoulders 93 and 103, and has a hole therein through which the post 44 projects into contact with the lever 48 which is attached to the false bottom and rests upon the upper end of the post 44.

The fittings for the three inch round and four inch round systems will appear in elevation the same as the flat four by seven inch and flat three by six inch fittings previously described, and with them the same false bottoms will be employed.

When the station unit is installed in three by six or four by seven edge type systems the carriers are dispatched from without the housing, as shown in Fig. 9. The dispatch terminal 120 there shown may be of any well known type through which carriers may be introduced into the outgoing transit tube 56. The tube 56 is connected by a coupling 57 with the dispatch opening B so that the air travelling in the system passes through the unit in the usual way. The dispatch opening B within the unit is provided with a fitting 130, see Figs. 10 and 11, comprising a ring 131 which receives the end of the coupling 57 in the usual manner, a flange 132 and a shoulder 133 on a separable upper portion 134. The fitting is secured to the flange 51 by bolts passed through the holes 53 therein and through holes 135 in the flange 132. The portion 134 is provided with holes which coincide with certain of the holes 135 and is thus connected to the lower portion by bolts 136 which secure the fitting to the flange 51. The portion 134 comprises a curved cross plate 137, on which the shoulder 133 is mounted and a strap 138 connected thereto. It will be noted that the fitting will permit the free travel of air from the station through the coupling 57 into the tube 56 and yet prevent the passage of a carrier into the opening B.

The delivery fitting 140 at the opening A for the three by six inch system is shown in Figs. 12 and 13. This fitting is similar to those previously described and comprises a ring 141 which receives the end of the tube 55, a flange 142 and shoulder 143. The flange 142 is provided with holes 144 so located that they coincide with the holes 52 in the base flange 50 whereby the fitting is attached to the base by bolts or the like. The fitting also includes an annular boss 145 on the flange 142 connected to the shoulder 143 by an integral insert 146 and forming a continuation of the carrier tube. The shoulder 143 coacts with the shoulder 133 of the fitting 130 to support a false bottom similar to the bottoms previously described which extend over the signal device and to which is secured a signal lever 48 which will coact with the post 44. The delivery fitting for the four by seven inch system is substantially the same as the fitting 140 save for the difference in dimensions obviously necessary and hence is not shown herein.

The station unit embodying this invention is equipped with fittings of the dimensions required by the system. The carriers arriving at the station pass through the fitting at opening A and fall upon the lever 48 and the false bottom provided above the base 21. The weight of the carrier causes the lever to depress the rod 44, and thereby actuate the signal device. The buffer 25 on the door 22 extends over whatever fitting is installed at opening B to such an extent that the carrier can not enter such fitting and thus prevents any inadvertent redispatch of the carrier. The travel of the carrier is preferably guided in the well known manner by a deflector 175 which directs the carrier onto the false bottom and signal lever. Carriers are dispatched either from the interior of the unit by opening the door 22 or in some instances as suggested in Fig. 9 from an outside terminal 120.

While one embodiment of the invention has been shown and described it will be understood that I am not limited thereto and that other embodiments may be made without departing from the spirit and scope of the invention as set forth in the following claims.

I claim:

1. A station unit for a pneumatic dispatch system, adapted for use as an element of any one of various systems, which differ in the dimensions of the carrier transporting tubes.

2. A station unit for a pneumatic dispatch system having a wall provided with openings and fittings on the wall at said openings by which the unit may be connected with transit tubes of different dimensions whereby the unit may be used as an element of any one of various systems which differ in the dimensions of the transit tubes.

3. A station unit for a pneumatic dispatch system having a wall provided with openings through which the unit may be connected with transit tubes of different dimensions whereby the unit may be used as an element of any one of various systems which differ in the dimensions of the transit tubes, and rings secured to the tubes and removably mounted upon the wall at said openings, said rings being of the proper dimension for securement to the tubes of the selected system of which the unit is an element.

4. A station unit for a pneumatic dispatch system having a wall provided with an opening through which carriers are delivered to the unit by a transit tube of the system of which the unit is an element said opening being of such size that it will coact with tubes of various dimensions.

5. A station unit for a pneumatic dispatch system having a wall provided with an opening through which carriers are delivered to the unit by a transit tube of the system of which the unit is an element, said opening being of such size that it will coact with tubes of various dimensions, and a flanged ring mounted upon the wall at said opening, the ring being attached to the end of the tube and the flange thereof closing the portions of the opening around the tube.

6. A station unit for a pneumatic tube system having a wall provided with openings through which the unit may be connected with the transit tubes of the system, flanged rings mounted upon the wall, the rings being attached to the ends of the tubes and the flanges thereof closing the portions of the openings around the tubes, and an inner wall connected to said flanged rings.

7. A station unit for a pneumatic tube system having a wall provided with openings through which the unit may be connected with the transit tubes of the system, flanged rings mounted upon the wall, the rings being attached to the ends of the tubes and the flanges thereof closing the portions of the openings around the tubes, a signal device mounted upon the wall between said openings and an inner wall connected to the flanged rings and extending inwardly of the signal device.

8. A station unit for a pneumatic tube system having a wall provided with openings through which the unit may be connected with the transit tubes of the system, flanged rings mounted upon the wall, the rings being attached to the ends of the tubes and the flanges thereof closing the portions of the openings around the tubes, an inner wall carried by the rings upon which wall arriving carriers impact and deflecting means for directing the carriers to said inner wall.

9. A station unit for a pneumatic tube system having a wall provided with openings through which the unit may be connected with the transit tubes of the system, flanged rings mounted upon the wall, the rings being attached to the ends of the tubes and the flanges thereof closing the portions of the openings around the tubes, an inner wall carried by the rings upon which wall arriving carriers impact, a signal device between said wall and said inner wall and means carried by the inner wall for operating the device upon the arrival of a carrier.

10. A station unit for a pneumatic tube system having a wall provided with openings through which the unit may be connected with the transit tubes of the system, flanged rings mounted upon the wall, the rings being attached to the ends of the tubes and the flanges thereof closing the portions of the openings around the tubes, an inner wall carried by the rings upon which wall arriving carriers impact, deflecting means for directing the carriers to the inner wall upon arrival through the delivery opening and means for preventing the entry of a carrier into the tube at the dispatch opening.

11. A station unit for a pneumatic tube system having a wall provided with openings through which the unit may be connected with the transit tubes of the system, flanged rings mounted upon the wall, the rings being attached to the ends of the tubes and the flanges thereof closing the portions of the openings around the tubes, a signal device mounted upon the wall between said openings, an inner wall connected to the flanged rings and extending inwardly of the signal device and means carried by said inner wall for operating the device upon the arrival of a carrier at the station unit.

12. A station unit for a pneumatic tube system having a wall provided with openings through which the unit may be connected with the transit tubes of the system and flanged rings mounted upon the wall, the rings being attached to the ends of the tubes and the flanges thereof closing the portions of the openings around the tubes, a signal device mounted upon the wall between said openings, an inner wall connected to the flanged rings and extending inwardly of the signal device, said inner wall having an opening through which a portion of the signal device projects and means carried by the inner wall for contacting with the projecting portion of the signal device upon arrival of a carrier at the station unit.

13. A station unit for a pneumatic tube system having a wall provided with openings through which the unit may be connected with the transit tubes of the system and flanged rings mounted upon the wall, the rings being attached to the ends of the tubes and the flanges thereof closing the portions of the openings around the tubes, an inner wall carried by the rings upon which wall arriving carriers impact, a signal device mounted in the first mentioned wall between the openings therein behind the inner wall which has a hole therein, said signal device including a post which projects through a hole, and a lever carried by the inner wall and adapted under impact of an arriving carrier to contact said post and operate said device.

14. A station unit for a pneumatic dispatch system comprising a housing having a wall provided with a carrier dispatch opening therein, a door for said housing and means carried by the door which means when the door is closed prevents the entry of a carrier into the dispatch opening.

15. A station unit for a pneumatic dispatch system comprising a housing having a base provided with a carrier dispatch opening therein, a door for said housing and a buffer member on the inner face of the door which member when the door is closed extends above the dispatch opening and prevents the entry of a carrier thereinto.

Signed by me at Syracuse, New York this twenty-ninth day of October 1930.

CHESTER S. JENNINGS.